United States Patent [19]

Simokat

[11] 4,380,688
[45] Apr. 19, 1983

[54] TELEPHONE RINGING RANGE EXTENDER

[75] Inventor: Frank L. Simokat, Broken Arrow, Okla.

[73] Assignee: TII Industries Inc., Copiague, N.Y.

[21] Appl. No.: 283,114

[22] Filed: Jul. 13, 1981

[51] Int. Cl.³ .................................. H04M 19/00
[52] U.S. Cl. .......................... 179/84 R; 179/81 R; 179/16 F
[58] Field of Search ............ 179/84 R, 16 F, 175.3 R, 179/51 AA, 81 R, 16 D

[56] References Cited

U.S. PATENT DOCUMENTS 3,852,536 12/1974 Chambers, Jr. .............. 179/16 F
3,992,591 11/1976 Ingle ............................ 179/16 F

*Primary Examiner*—G. Z. Rubinson
*Assistant Examiner*—James L. Dwyer
*Attorney, Agent, or Firm*—Martin Sachs

[57] ABSTRACT

A circuit arrangement utilized for extending the ringing range of a single party telephone service utilized on long rural line loops where the ringer and a blocking capacitor of the subscriber's telephone instrument has been connected across the tip and ring electrical conductors of the loop includes; a pair of terminals connected to the tip and ring conductors of the subscriber's line, a zener diode connected from one of the electrical conductors with a capacitor connected in parallel therewith. A switching device is connected in series with the parallel connection of the zener diode and capacitor providing a current path to a reference ground. A circuit device responsive to the application of the ringing signal voltage between a reference ground and the other electrical conductor of the subscriber loop activates the switching means to provide a relatively low impedance current path effectively removing one of the electrical conductors from the subscriber loop of the ringing circuit, therefore enabling the ringing voltage to be extended over a loop which is double the length of the normal rural subscriber loop.

11 Claims, 2 Drawing Figures

TELEPHONE RINGING RANGE EXTENDER

BACKGROUND OF THE INVENTION

1. Field of the Invention

The present invention relates to telephone ringing devices, and in particular, to a telephone ringing range extender that is capable of being utilized over relatively long single party telephone rural line loops.

2. Discussion of the Relevant Art

Ever since the use of telephone subscriber lines which extended long distances in rural communities, many attempts have been made to overcome the DC resistance presented in these long loops. One of these techniques includes the use of a boost voltage inserted into the line in order to extend the transmission and signaling range of the telephone transmission line. Of course, it was necessary to insert these boost voltages without interfering with the normal monitoring and testing of these long lines. Typical of this type of circuit arrangement is disclosed in U.S. Pat. No. 3,992,591 issued on Nov. 16, 1976 to E. C. Ingle and U.S. Pat. No. 3,852,536 issued on Dec. 3, 1974 to C. W. Chambers, Jr.

A simple circuit arrangement to effectively provide the same result is disclosed in the instant invention. Instead of applying an additional voltage to extend the range of the subscriber line the instant invention effectively grounds one of the electrical conductors in the loop pair, thereby, halving its resistance and permitting the same voltage to generate the same current over twice the length of the subscriber line.

SUMMARY OF THE PRESENT INVENTION

Therefore, it is an object of the present invention to provide a simple circuit arrangement to extend the ringing range capacity of the central office without introducing an additional boost voltage.

It is another object of the present invention to provide a ringing range extender utilized on rural subscriber lines which may be selective to the ringing voltage applied by the central office and non-susceptible to external AC signals which may be conductively coupled to the line.

It is yet another object of the present invention to provide a ringing range extender which permits the subscriber loop to remain balanced except when the ringing voltage is supplied to the subscriber line by the central office.

It is yet another object of the present invention to keep the rural subscriber loop in its original balanced condition until a ringing voltage is supplied.

A ringing range extender, according to the principles of the present invention, for single party telephone service on long rural line loops wherein the ringer and a blocking capacitor of a subscriber's telephone instrument have been connected across the tip and ring electrical conductors of the loop comprises, in combination, first and second terminals adapted to be DC coupled to the tip and ring conductors of the subscriber's line connecting the subscriber's telephone instrument to a central office to provide for the application of the central office battery and AC ringing signal voltages across the terminals. Semiconductor breakover means and capacitor means connected in parallel thereto have one end of the capacitor means connected to one of the subscriber loop conductors. Switching means is connected between a reference ground and the other end of the capacitance means to provide a relatively low DC series current path from one of the subscriber loop conductors through the semiconductor breakover means to the ground reference upon activation of the switching means. The switching means normally provides a relatively high impedance when de-activated. A circuit arrangement responsive to the application of a ringing signal voltage supplied by the central office across the subscriber loop conductors provides an activating voltage to the switching means.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be fully understood, it will now be described, by way of example, with reference to the accompanying drawing in which.

DESCRIPTION OF THE PREFERRED EMBODIMENTS

Figure 1:
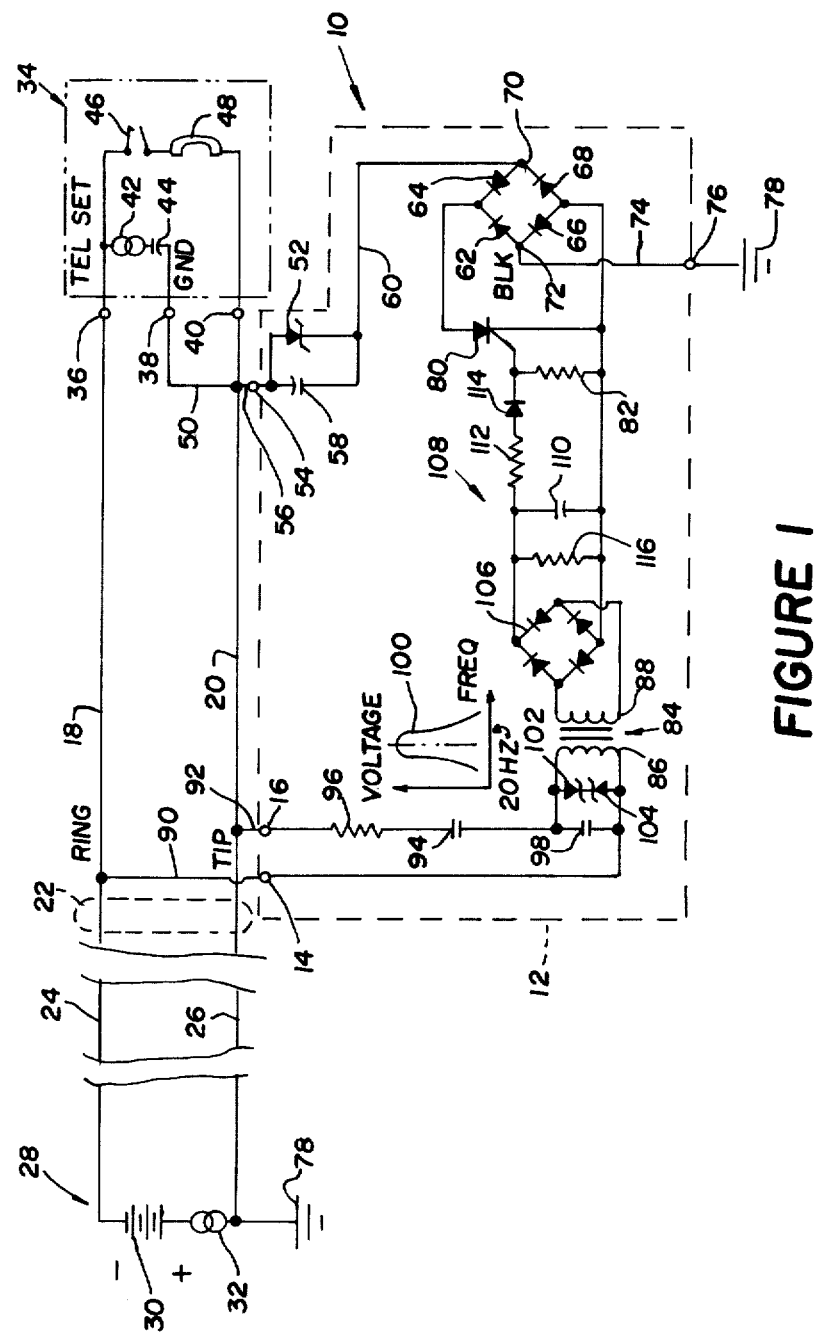
FIG. 1 is a schematic circuit arrangement of a ringing range extender, according to the principles of the present invention.

Referring now to the figures, and in particular to FIG. 1, wherein there is disclosed a ringing range extender circuit arrangement 10 disposed within the broken line 12. The ringing range extender circuit arrangement 10 is preferably included in a housing, not shown, that is provided with a pair of terminals 14 and 16 which are connected to the ring electrical conductor 18 and the tip electrical conductor 20, respectively, of a subscriber line loop 22. Line loop 22 has one end thereof connected by a pair of transmission lines 24 and 26 to the central office 28 which includes the central office test station, not shown, that has incorporated therein the DC central office battery potential 30 and the AC ringing signal voltage 32.

The other end of line loop or drop wire 22 is connected to a conventional telephone set 34 which includes a conventional three wire circuit having three terminals 36, 38 and 40 utilized for making the wiring connections to the plant or facility outside of the subscriber's dwelling. As shown, the telephone set or instrument 34 includes a ringer 42 and a blocking capacitor 44 connected in series between terminals 36 and 38 and also a hook switch 46 and a hand-set 48 connected in series between terminals 36 and 40. Hook switch 46 is normally in its open position as long as hand-set 48 is placed on its hook or cradle and is closed when hand-set 48 is removed therefrom for dialing or speaking purposes.

Where the telephone set 34 is to be utilized on relatively rural subscriber lines with individual ringing service, terminals 38 and 40 are connected together, either internally prior to installation or by the installing technician, by means of a jumper wire 50. Thus, so far, a typical rural line loop has been described with individual subscriber ringing. Because the DC resistance of the loop determines the amount of current flowing therein when the ringing voltage 32 is applied from the central office, the resistance or distance of the subscriber's telephone set from the central office becomes critical, since a certain minimum ringing current must flow in order to energize the ringer 42.

It becomes obvious, to those knowlegeable in the art, that reducing the resistance of the loop 22 would provide additional current flow in the loop path when the ringing voltage is applied. Thus, if means were made available to remove one-half of the loop, the distance that the telephone instrument may be placed from the central office may be doubled. As will be described hereinafter the present circuit arrangement effectively bypasses one-half of the line loop by providing a low impedance current path around one of the electrical conductors of the loop only when ringing voltage is supplied by the central office.

The ringing range extender 10 includes a zener diode 52, which has its anode electrode connected, via a conveniently provided terminal 54 and a wire 56 to one conductor, as illustrated the tip conductor 20, of line loop 22. A capacitor 58 is connected in parallel with zener diode 52. The cathode electrode of zener diode 52 is connected, via a wire 60, to a conventional diode bridge which includes diodes 62, 64, 66 and 68, at the juncture 70 of the anode electrode of diode 64 and the cathode electrode of diode 68. The anode electrode of diode 62 and the cathode electrode of diode 66 are connected together at point 72 and, via a wire 74, terminal 76 is connected to a ground reference 78, which is preferably earth ground. A semiconductor device, preferably a silicon controlled rectifier (SCR) 80 has its anode electrode connected to the juncture of the cathode electrodes of diodes 62 and 64 and has its cathode electrode connected to the juncture of anode electrodes of diode 66 and 68, thereby providing a low impedance AC path from point 70 to 72 and, therefore, to ground reference 78 when the SCR 80 is turned "on" (placed on its low impedance state), by a voltage applied between its gate electrode and cathode electrode or appearing across resistor 82 which is connected thereacross.

Further included in the ringing range extender circuit arrangement is a transformer 84 having a primary winding 86 and a secondary winding 88. Primary winding 86 is AC coupled to terminals 14 and 16 which in turn are connected by wires 90 and 92 to the ring 18 and tip 20 electrical conductors of loop 22. The coupling of winding 86 to terminals 14 and 16 is accomplished, via a coupling capacitor 94 and a resistor 96 connected in series, so that when the central office AC ringing signal is applied to the line to ring telephone 34 it is impressed across the primary winding 86 without being affected by any DC voltage on the line loop 22. The primary of transformer 84 is tuned by means of an additional capacitor 98. Capacitor 98 is connected across the primary winding 86 to form a parallel resonant circuit which is designed to resonate at the frequency of the applied central office ringing signal voltage which usually is 20 Hz. The frequency response curve for this resonant circuit is indicated at 100.

As a result of this frequency selective arrangement only the 20 Hz ringing signal voltage will be coupled ointo the transformer's secondary coil or winding 88 without attenuation while signals at non-resonant frequencies will be attenuated. Preferably, a pair of zener diodes 102 and 104 are connected in series, with their anodes connected across the transformer primary winding 86 to clip the positive and negative peaks of the 20 Hz ringing signal that is coupled into the transformer secondary. The zener potential of diodes 102 and 104 are equal and are selected at some suitable value such as, for example, 6 volts. In such a case, the peak-to-peak voltage of the ringing signal in the secondary winding of the transformer will be reduced to 12 volts.

Rectifier bridge 106, of the conventional type, is connected to the secondary coil 88 of transformer 84 in a conventional manner, to provide full wave rectification of the clipped ringing signal voltage. The rectified ringing signal voltage is applied to a filter 108 which includes a capacitor 110 to smooth the full waved rectified wave form and to thereby produce a steady DC signal current which is conducted through a resistor 112 and a diode 114 to feed the gate electrode of SCR 80. A resistor 116 is placed across, or in parallel with, capacitor 110 to insure the complete discharge thereof upon the removal of the AC ringing signal voltage.

When the 20 Hz central office ringing signal voltage is appllied across input terminals 14 and 16 which appear across lines 18 and 20 of the ringing range extender 10, the 20 Hz will be coupled into the secondary of transformer 84 as previously explained to develop the direct current that is fed to the gate electrode of SCR 80 to turn the SCR on. When this happens the ringer 42 will be connected to the ground reference 78, via capacitor 44, capacitor 58 in parallel with zener diode 52, through diode 64, SCR 80 and diode 66, or if the polarity of the ringing voltage is of the opposite polarity, via diode 68, SCR 80 and diode 62. SCR 80 will remain on throughout the ringing interval that the ringing signal voltage is applied because gate current is conducted to SCR 80 throughout the ringing interval.

When SCR 80 turns off (returns to its high impedance state) it opens the current conducting circuit path between ringer 42 and the earth ground connection 78 to keep the ringer disconnected from the ground except for the time periods when the central office ringing signal voltage is applied to the line to ring the telephone 34. Thus, since terminal 38 is connected, via wire 50 to one side, as shown the tip side 20 of line loop 22, conductor 20 is kept grounded during the application of the ringing signal voltage at the instrument end of the line loop.

Since the ringing signal voltage 32 has one end connected to reference ground 78 and the other end of the signal connected through the battery 30 to the ring side of the line 18 the return path of the ringing signal voltage is through earth ground 78 which is a much lower impedance than the electrical conductor 20 of the line loop 22. This, therefore, reduces the DC resistance of line loop 20 to approximately one-half of the value then it would be if a ground was not imposed upon both ends of one of the line conductors.

Obviously, those knowledgeable in the art, can readily arrange for the connection to be reversed so that the ground may be applied to both ends of the ring electrical conductor 18 and the AC ringing signal voltage be applied between reference ground and the tip electrical conductor 20 of the subscriber loop 22. Thus, it becomes obvious that for the same ringing signal voltage the line loop may be twice as long for the same equivalent voltage being applied and still maintain proper ringing current at the telephone instrument 34.

Figure 2:
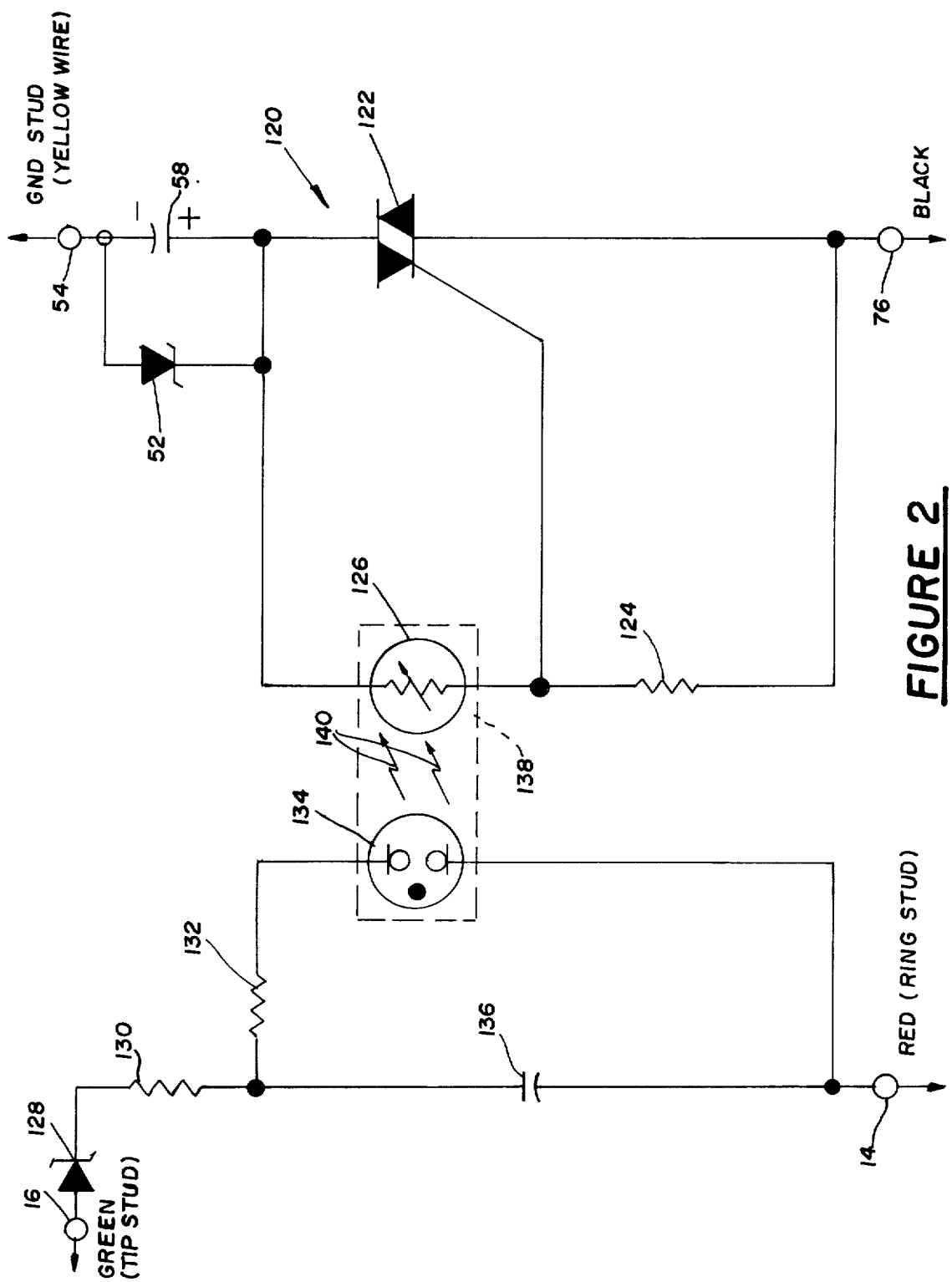
FIG. 2 is a schematic circuit diagram of an alternate embodiment of a ringing range extender, according to the principles of the present invention.

Referring now to FIG. 2 which discloses an alternate configuration for the ringing range extender and may be connected in the same manner as the embodiment disclosed in FIG. 1. Like terminals have been given the same numeral designation and may be connected in the same manner. The circuit arrangement for a ringing range extender 120 includes the same zener diode 52 connected in parallel with a capacitor 58. The anode electrode of zener diode 52 is connected to terminal 54. Connected to the cathode electrode for zener diode 52 is a solid state switch 122, commonly referred to as a triac, which as its anode electrodes connected from the cathode electrode of zener diode 52 to terminal 76. A resistor 124 is connected from the gate electrode of triac 122 to terminal 76. A light dependent resistor 126 is connected from the gate electrode of triac 122 to the cathode electrode of zener diode 52.

When light dependent resistor 126 is in its high impedance state very little, if any, current can flow into the gate electrode of triac 122. Therefore, regardless of the polarity applied across the anode electrodes of triac 122, it remains in its high impedance state, thereby keeping the current conductive path between terminals 54 and 76 effectively incomplete (very high impedance). Terminal 76 is connected to common reference ground (earth ground) in the same manner as the embodiment disclosed in FIG. 1 and terminal 54 is connected to the tip electrical conductor 20 of the line loop 22 as shown in FIG. 1. Terminals 14 and 16 are also connected in the same manner as shown in FIG. 1. A zener diode 128 is connected in series with resistors 130 and 132 and a neon tube or bulb 134 to terminal 14. A capacitor 136 is connected from terminal 14 to the juncture point of resistors 130 and 132. Neon tube 134 is placed in close proximity with light dependent resistor 126 and, preferably placed in a light tight housing 138 so that only light rays 140 emanating from neon bulb 134 will be caused to fall on light dependent resistor 126, thereby preventing the light dependent resistor to change to a low impedance state because of ambient light impinging thereupon.

The AC ringing signal voltage appearing across terminals 14 and 16 will be rectified by diode 128 and will provide a current to charge capacitor 136. Capacitor 136 will charge until the voltage thereacross exceeds the breakover voltage of neon tube 134. Upon the breakover voltage being exceeded neon tube 134 will emit light rays 140 which will impinge on the light dependent resistor 126, thereby causing resistor 126 to change to its low impedance state. When the light dependent resistor 126 changes to its low impedance state it permits sufficient current to flow into the gate electrode of triac 122, thereby changing it to a low impedance state completing a current path of relatively low impedance from terminal 54 to terminal 76, thereby connecting the ringer 42 and locking capacitor 44 to reference ground in a manner similar to that described in the embodiment in FIG. 1.

From the foregoing description, it is clear that the ringing range extender 120 keeps the ringer 22 disconnected from ground except during the time that the central office ringing signal is applied to ring the ring party's telephone 34. As a result, any impedance imbalance that may be caused by connecting the telephone ringer or ringers to ground will not be present to cause objectionable noise currents to be transmitted along with any voice currents when the called and calling parties are interconnected. As is well known, these noise currents may develop under conditions where the impedance to ground on the tip side of the transmission line is not equal to the impedance to ground on the ring side of the line. Such an impedance imbalance often occurs as a result of having more ringers connected to one side of the line than the other. A zener diode 128 in addition to rectifying an incoming ringing signal, also protects neon tube 134 and capacitor 136 against damage to the voltage force.

Hereinbefore has been disclosed a ringing range extender that is suitable for use on long rural line loops wherein the ringer and its associated blocking capacitor has already been connected across the tip and ring terminals of the telephone instrument. Utilizing the circuit arrangement disclosed will greatly extend the usable distance over which a given central office signal voltage may be utilized. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A ringing range extender for single party telephone service on long rural line loops wherein the ringer and a blocking capacitor of a subscriber's telephone instrument has been connected across the tip and ring electrical conductors of said loop comprising, in combination:
    (a) first and second terminals adapted to be DC coupled to said tip and ring conductors of said subscriber's line connecting said subscriber's telephone instrument to a central office to provide for the application of the central office battery and AC ringing signal voltages across said terminals;
    (b) semiconductor, breakover means;
    (c) capacitor means, connected in parallel with said semiconductor breakover means, one end of said capacitor means being connected to one of said subscriber loop conductors;
    (d) switching means, said switching means being connected between a ground reference and the other end of said capacitor means for providing a relatively low impedance DC series current path from said one of the subscriber loop conductors through said semiconductor breakover means to said ground reference upon activation of said switching means, said switching means providing a relatively high impedance when de-activated; and
    (e) circuit means responsive to the application of a ringing signal voltage from the other of said subscriber loop conductors to said reference ground for providing an activating voltage to said switching means.

2. A ringing range extender according to claim 1 wherein said semiconductor breakover means is a zener diode, the anode electrode of said zener diode being connected to one of said subscriber loop conductors.

3. A ringing range extender according to claim 1 wherein said switching means is a semiconductor device.

4. A ringing range extender according to claim 3 wherein said semiconductor device is a silicon controlled rectifier.

5. A ringing range extender according to claim 3 wherein said semiconductor device is a triac.

6. A ringing range extender according to claim 1 wherein said circuit means includes means for selecting said ringing voltage.

7. A ringing range extender according to claim 6 wherein said ringing voltage is 20 Hz and said means for selecting said ringing voltage is a tuned circuit arrangement resonant at said ringing voltage frequency.

8. A ringing range extender for single party telephone service on long rural line loops wherein the ringer and a blocking capacitor of a subscriber's telephone instrument is connected across the tip and ring electrical conductors of said loop comprising, in combination:
   (a) first and second terminals adapted to be DC coupled to said tip and ring conductors of said subscriber's line connecting said subscriber's telephone instrument to a central office to provide for the application of the central office battery and AC ringing signal voltages across said terminals;
   (b) a first zener diode having anode and cathode electrodes, said first zener diode anode electrode being connected to one of said subscriber's electrical loop conductors;
   (c) a first capacitor, said first capacitor being connected across said zener diode;
   (d) circuit means for maintaining said telephone ringer disconnected from a reference ground in its de-activated state, in its activated state said circuit means completing a current conduction current path connecting said zener diode cathode electrode to said reference ground;
   (e) a second zener diode;
   (f) a second capacitor connected in series with said second zener diode, said second zener diode and said second capacitor being connected between said first and second terminals such that said second zener diode is forward biased by ringing signal alternations of one preselected polarity to rectify the central office ringing signal for supplying rectified ringing signal current to charge said capacitor; and
   (g) a current conducting light emitting device connected in series with said second zener diode and in parallel with said capacitor in a discharge path for said capacitor, said device being in a non-conducting state in which it emits no light when the voltage across said capacitor is below a preselected value, said device being responsive to an increase in the voltage across said capacitor above said preselected value to emit light upon conducting current, said emitted light being coupled to said circuit means for changing it from its deactivated state to its activated state.

9. A ringing range extender according to claim 8 wherein said circuit means includes a triac having its anode electrodes connected between said reference ground and said cathode electrode of said first zener diode, and a light sensitive resistor connected between said cathode electrode of said first zener diode and the gate electrode of said triac to supply gate current thereto.

10. A ringing range extender according to claim 8 wherein said current conducting light emitting device is a neon bulb.

11. A ringing range extender for single party telephone service on long rural line loops wherein the ringer and a blocking capacitor of a subscriber's telephone instrument is connected across the tip and ring electrical conductors of said loop comprising, in combination:
   (a) first and second terminals adapted to be DC coupled to said tip and ring conductors of said subscriber's line connecting said subscriber's telephone instrument to a central office to provide for the application of the central office battery and AC ringing signal voltages across said terminals;
   (b) a first zener diode having anode and cathode electrodes, said first zener diode anode electrode being connected to one of said subscriber's electrical loop conductors;
   (c) a first capacitor, said first capacitor being connected across said zener diode;
   (d) circuit means for maintaining said telephone ringer disconnected from a reference ground in its de-activated state, in its activated state said circuit means completing a current conduction current path connecting said zener diode cathode electrode to said reference ground; and
   (e) frequency selective circuit means connected to said first and second terminals and tuned to pass the AC ringing signal voltage that is applied by said central office to ring said subscriber's telephone instrument, said frequency selective circuit means being coupled to said circuit means and providing a signal voltage to change said circuit means from its de-activated state to its activated state when ringing voltage within the frequency selective range is applied by said central office.

* * * * *